(12) United States Patent
Rodrigues Machado et al.

(10) Patent No.: US 11,409,419 B2
(45) Date of Patent: Aug. 9, 2022

(54) SOUND-DIRECTED GRAPHIC ACCESSIBILITY

(71) Applicant: LENOVO (Singapore) PTE. LTD., New Tech Park (SG)

(72) Inventors: Rafael Rodrigues Machado, Sorocaba (BR); Marcelo da Costa Ferreira, Campina (BR)

(73) Assignee: Lenovo (Singapore) PTE. LTD., New Tech Park (SG)

(*) Notice: Subject to any disclaimer, the term of this patent is extended or adjusted under 35 U.S.C. 154(b) by 0 days.

(21) Appl. No.: 17/111,363

(22) Filed: Dec. 3, 2020

(65) Prior Publication Data
US 2022/0179529 A1 Jun. 9, 2022

(51) Int. Cl.
*G06F 3/0484* (2022.01)
*H04R 5/02* (2006.01)
*G06F 3/16* (2006.01)

(52) U.S. Cl.
CPC ........... *G06F 3/0484* (2013.01); *G06F 3/16* (2013.01); *H04R 5/02* (2013.01); *H04R 2499/15* (2013.01)

(58) Field of Classification Search
CPC .......... G06F 3/0484; G06F 3/16; H04R 5/02; H04R 2499/15
See application file for complete search history.

(56) References Cited

PUBLICATIONS https://www.youtube.com/watch?v=Gis8f-Bz4gQ The Accessible Tactile Tablet for Kids who are Visually Impaired (Jun. 6, 2018) (Year: 2018).*
https://www.closingthegap.com/feelif-when-the-blind-became-digitally-sighted/# (Year: 2021).*
https://www.feelif.com/ (Year: 2016).*

* cited by examiner

*Primary Examiner* — Cao H Nguyen
(74) *Attorney, Agent, or Firm* — Kunzler Bean & Adamson (57) ABSTRACT

Apparatuses, methods, systems, and program products are disclosed for sound-directed graphic accessibility. An apparatus includes a processor and a memory that stores code executable by the processor. The code is executable by the processor to present a graphic on a touch-enabled display of a device. The graphic may be formatted as a binary graphic with lines defining edges of objects within the graphic. The code is executable by the processor to detect a touch on the touch-enabled display. The code is executable by the processor to, in response to determining that the touch is at a location on the display that corresponds to a line of the graphic, provide at least one sound to direct the touch to follow the line of the graphic.

20 Claims, 6 Drawing Sheets

SOUND-DIRECTED GRAPHIC ACCESSIBILITY

FIELD

The subject matter disclosed herein relates to accessibility and more particularly relates to sound-directed graphic accessibility.

BACKGROUND

Making images and graphics on a display accessible to visually impaired users is difficult without the use of tactile devices. Tactile devices, however, may not be cost-effective for most users and may not have general applicability for different applications, graphics, images, or the like. Moreover, the human body has a capacity to evolve a given sense when another ceases to exist in a process known as neuroplasticity. This occurs, for instance, with visually impaired people who possess highly sharpened hearing as well as a rather detailed touch.

BRIEF SUMMARY

Apparatuses, methods, systems, and program products are disclosed for sound-directed graphic accessibility. An apparatus, in one embodiment, includes a processor and a memory that stores code executable by the processor. The code, in certain embodiments, is executable by the processor to present a graphic on a touch-enabled display of a device. The graphic may be formatted as a binary graphic with lines defining edges of objects within the graphic. The code, in various embodiments, is executable by the processor to detect a touch on the touch-enabled display. In one embodiment, the code is executable by the processor to, in response to determining that the touch is at a location on the display that corresponds to a line of the graphic, provide at least one sound to direct the touch to follow the line of the graphic.

A method for sound-directed graphic accessibility, in one embodiment, includes presenting, by a processor, a graphic on a touch-enabled display of a device. The graphic may be formatted as a binary graphic with lines defining edges of objects within the graphic. The method, in further embodiments, includes detecting a touch on the touch-enabled display. In certain embodiments, the method includes, in response to determining that the touch is at a location on the display that corresponds to a line of the graphic, providing at least one sound to direct the touch to follow the line of the graphic.

A computer program product for sound-directed graphic accessibility, in one embodiment, includes a computer readable storage medium having program instructions embodied therewith. In certain embodiments, the program instructions are executable by a processor to cause the processor to present a graphic on a touch-enabled display of a device. The graphic may be formatted as a binary graphic with lines defining edges of objects within the graphic. In some embodiments, the program instructions are executable by a processor to cause the processor to determine one or more fit settings for the identified user, the one or more fit settings for sizing the HMD unit to the identified user. In further embodiments, the program instructions are executable by a processor to cause the processor to, in response to determining that the touch is at a location on the display that corresponds to a line of the graphic, provide at least one sound to direct the touch to follow the line of the graphic.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. The code, in certain embodiments, is executable by the processor to present a graphic on a touch-enabled display of a device. The graphic may be formatted as a binary graphic with lines defining edges of objects within the graphic. The code, in various embodiments, is executable by the processor to detect a touch on the touch-enabled display. In one embodiment, the code is executable by the processor to, in response to determining that the touch is at a location on the display that corresponds to a line of the graphic, provide at least one sound to direct the touch to follow the line of the graphic.

In one embodiment, the code is executable by the processor to, in response to determining that the touch is at a location on the display that does not correspond to a line of the graphic, provide at least one sound to direct the touch to a line of the graphic that is nearest to the touch. The at least one sound to direct the touch to a line of the graphic that is nearest to the touch may be different from the at least one sound to direct the touch to follow the line of the graphic.

In one embodiment, the code is executable by the processor to detect that the touch is at an intersection of a plurality of lines of the graphic and provide a plurality of different sounds to direct the touch to each of the intersecting lines individually. Each of the plurality of sounds may correspond to a direction of each of the plurality of intersecting lines from a location of the touch. In certain embodiments, the plurality of different sounds comprises a plurality of different beeps.

In one embodiment, the code is executable by the processor to provide the at least one sound through a plurality of speakers of the device using stereo sound orientation to provide an audio direction for following the line with the touch in the direction of the at least one sound. In some embodiments, the audio direction for an initial touch is in a direction based on a navigation orientation from a bottom of the display towards a top of the display. In various embodiments, the audio direction comprises at least one of left, right, front, back, and/or a combination of the foregoing.

In some embodiments, the at least one sound is associated with at least one pixel of the graphic that is located along the line at a position that is adjacent to a current pixel that corresponds to the touch. In certain embodiments, metadata for the at least one sound is encoded in metadata for the at least one pixel.

In one embodiment, the code is executable by the processor to receive the graphic for presentation on the display and format the graphic as the binary graphic using at least one image processing algorithm for identifying and defining the edges of the objects within the graphic prior to presenting the graphic on the display.

In one embodiment, the binary graphic comprises a graphic where one color represents the lines of the objects within the graphic and one color represents a background. The code may be executable by the processor to determine that the touch is at a location on the display that corresponds to a line of the graphic by determining whether at least one pixel corresponding to the touch comprises a color that represents a line of the graphic.

In one embodiment, a sound associated with a color that represents a line of the graphic is different from a sound that represents a background of the graphic. In certain embodiments, the code is executable by the processor to dynamically zoom a portion of the display around the touch in response to the graphic at the touch location comprising a plurality of lines that are covered simultaneously by the touch. In some embodiments, the code is executable by the processor to provide an audible indication of an amount of the graphic that has been touched and/or an indication of an amount of the graphic that remains untouched.

A method for sound-directed graphic accessibility, in one embodiment, includes presenting, by a processor, a graphic on a touch-enabled display of a device. The graphic may be formatted as a binary graphic with lines defining edges of objects within the graphic. The method, in further embodiments, includes detecting a touch on the touch-enabled display. In certain embodiments, the method includes, in response to determining that the touch is at a location on the display that corresponds to a line of the graphic, providing at least one sound to direct the touch to follow the line of the graphic.

In one embodiment, the method includes, in response to determining that the touch is at a location on the display that does not correspond to a line of the graphic, providing at least one sound to direct the touch to a line of the graphic that is nearest to the touch. The at least one sound to direct the touch to a line of the graphic that is nearest to the touch may be different from the at least one sound to direct the touch to follow the line of the graphic.

In one embodiment, the method includes detecting that the touch is at an intersection of a plurality of lines of the graphic and providing a plurality of different sounds to direct the touch to each of the intersecting lines individually. Each of the plurality of sounds may correspond to a direction of each of the plurality of intersecting lines from a location of the touch.

In one embodiment, the method includes providing the at least one sound through a plurality of speakers of the device using stereo sound orientation to provide an audio direction for following the line with the touch in the direction of the at least one sound. In certain embodiments, the method includes dynamically zooming a portion of the display around the touch in response to the graphic at the touch location comprising a plurality of lines that are covered simultaneously by the touch.

A computer program product for sound-directed graphic accessibility, in one embodiment, includes a computer readable storage medium having program instructions embodied therewith. In certain embodiments, the program instructions are executable by a processor to cause the processor to present a graphic on a touch-enabled display of a device. The graphic may be formatted as a binary graphic with lines defining edges of objects within the graphic. In some embodiments, the program instructions are executable by a processor to cause the processor to determine one or more fit settings for the identified user, the one or more fit settings for sizing the HMD unit to the identified user. In further embodiments, the program instructions are executable by a processor to cause the processor to, in response to determining that the touch is at a location on the display that corresponds to a line of the graphic, provide at least one sound to direct the touch to follow the line of the graphic.

Figure 1:
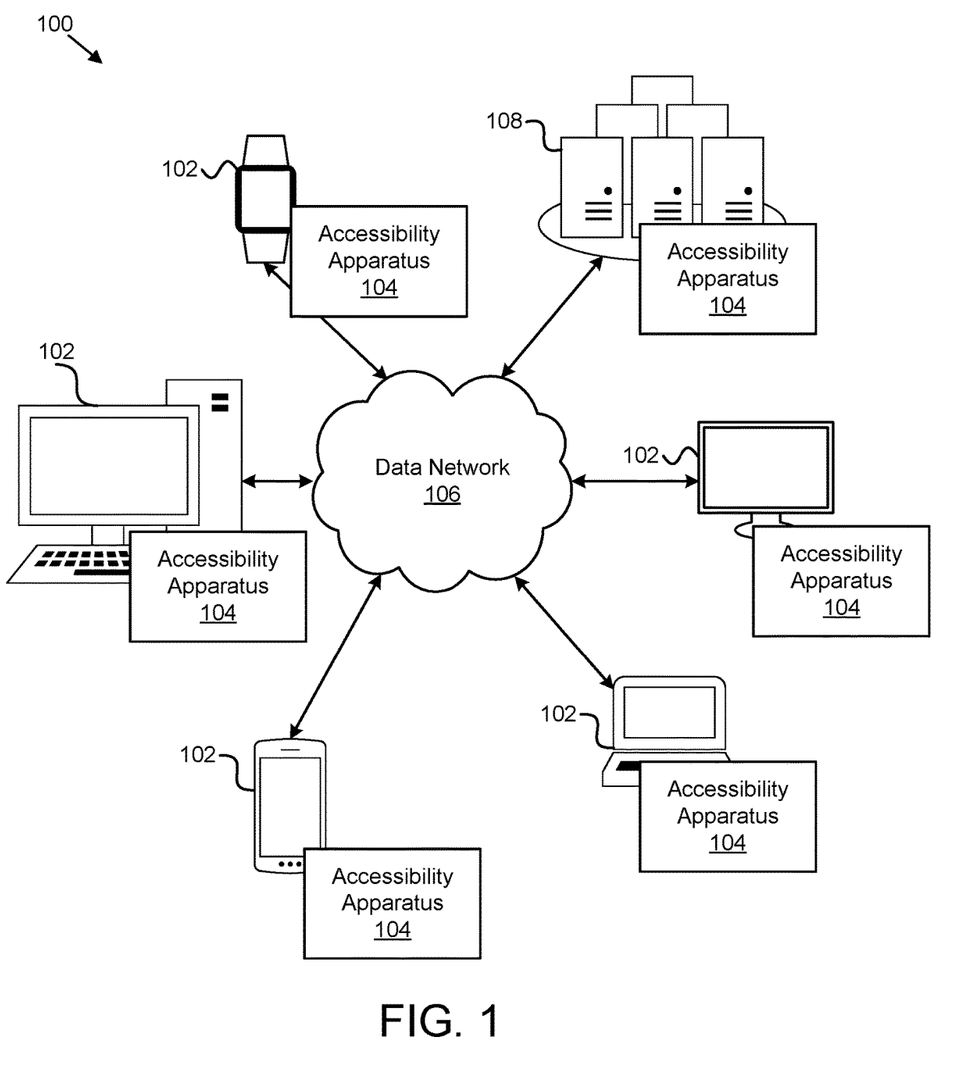
FIG. 1 is a schematic block diagram illustrating one embodiment of a system for sound-directed graphic accessibility.

FIG. 1 is a schematic block diagram illustrating one embodiment of a system 100 for sound-directed graphic accessibility. In one embodiment, the system 100 includes one or more information handling devices 102, one or more accessibility apparatuses 104, one or more data networks 106, and one or more servers 108. In certain embodiments, even though a specific number of information handling devices 102, accessibility apparatuses 104, data networks 106, and servers 108 are depicted in FIG. 1, one of skill in the art will recognize, in light of this disclosure, that any number of information handling devices 102, accessibility apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like. In certain embodiments, the information handling devices 102 include components for receiving touch input, e.g., touch-enabled displays, and for providing audio sound, e.g., at least one speaker.

In general, in one embodiment, the accessibility apparatus 104 is configured to provide a visually-impaired user with means for understanding the contents of a graphic, such as an image, presented on a display by using sound or audio orientation to direct a user's touch on the display. The accessibility apparatus 104, in one embodiment, is configured to present a graphic on a touch-enabled display of a device 102. The graphic may be formatted as a binary graphic with lines defining edges of objects within the graphic. In further embodiments, the accessibility apparatus 104 is configured to detect a touch on the touch-enabled display, and, in response to determining that the touch is at a location on the display that corresponds to a line of the graphic, provide at least one sound to direct the touch to follow the line of the graphic.

In this manner, the accessibility apparatus 104 provides an application that can be executed on various existing, low-cost devices (e.g., tablets, smart phones, or the like) to allow visually impaired users to understand the content of an image by means of sound orientation, e.g., using sound feedback to direct a user's touch on a touch-enabled display along lines presented on the display that define the graphic. The accessibility apparatus 104, including its various sub-modules, may be located on one or more information handling devices 102 in the system 100, one or more servers 108, one or more network devices, and/or the like. The accessibility apparatus 104 is described in more detail below with reference to FIGS. 2 and 3.

In certain embodiments, the accessibility apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the accessibility apparatus 104 may include a power interface, a wired and/or wireless network interface, a graphical interface that attaches to a display, and/or a semiconductor integrated circuit device as described below, configured to perform the functions described herein with regard to the accessibility apparatus 104.

The accessibility apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the accessibility apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the accessibility apparatus 104.

The semiconductor integrated circuit device or other hardware appliance of the accessibility apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the accessibility apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may host, store, stream, or the like files and content to a different device such as documents, videos, music, podcasts, images, games, web pages, augmented and/or virtual reality environments, and/or the like.

Figure 2:
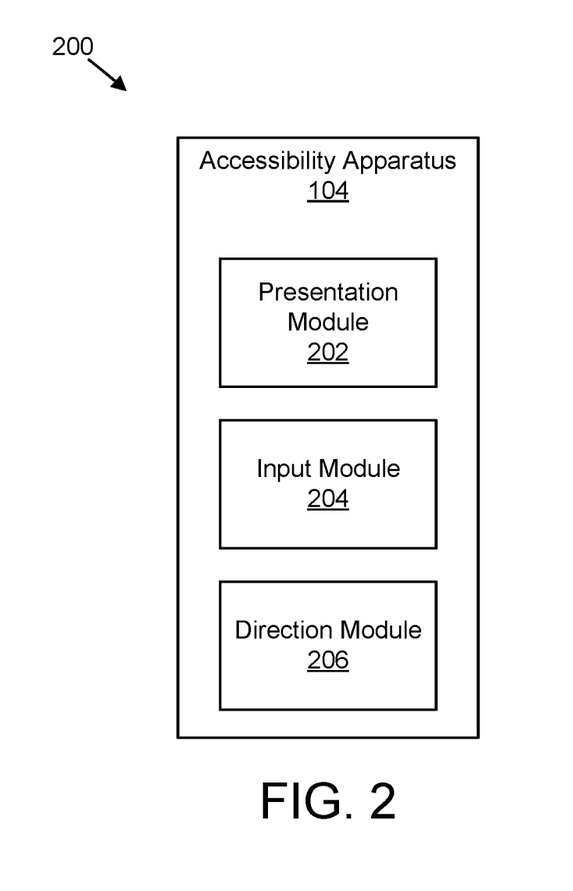
FIG. 2 is a schematic block diagram illustrating one embodiment of an apparatus for sound-directed graphic accessibility.

FIG. 2 is a schematic block diagram illustrating one embodiment of an apparatus 200 for sound-directed graphic accessibility. In one embodiment, the apparatus 200 includes an instance of an accessibility apparatus 104. In one embodiment, the accessibility apparatus 104 includes one or more of a presentation module 202, an input module 204, and a direction module 206, which are described in more detail below.

The presentation module 202, in one embodiment, is configured to present a graphic on a touch-enabled display of a device 102. The graphic, in certain embodiments, is formatted as a binary graphic comprising two colors, e.g., black and white, with lines defining edges of objects within the graphic. For instance, the background of the image may be white and the lines or edges defining the contents, objects, items, or the like in the image may be black. Formatting of the graphic is described in more detail below with reference to the graphic module 302.

The presentation module 202 may present the binary graphic on the touch-enabled display in response to receiving, accessing, or the like the graphic, in response to a device being placed in an accessibility mode, as part of an accessibility application, an accessibility plugin for a separate application, a browser extension, and/or the like. In other words, the presentation module 202 may present the binary graphic in various contexts to assist a user who is visually impaired.

The input module 204, in one embodiment, is configured to detect a touch on the touch-enabled display. The input module 204 may detect a finger, stylus, or other object placed against the touch-enabled display. The input module 204, in certain embodiments, determines a location of the detected input. The location may be an absolute location on the touch-enabled display, a location relative to another reference point, e.g., a bezel, a corner, a predefined point on the display, and/or the like.

The location may be defined in terms of coordinates such as x- and y-coordinates, or some other coordinate grid or system for the touch-enabled display. For example, the touch input may be detected at an (x,y) coordinate pair, a predefined area/square/box/etc. of a grid, or the like that corresponds to at least one pixel of the graphic presented on the touch-enabled display.

The direction module 206, in one embodiment, is configured to, in response to determining that the touch is at a location on the display that corresponds to a line of the graphic, e.g., a pixel having a color that represents a line of the graphic, provide at least one sound to direct the touch to follow the line of the graphic. In such an embodiment, the direction module 206 may be in communication with a sound processor, a sound card, a sound driver, a sound program or application, and/or the like to trigger, activate, cause, initiate, and/or the like one or more sounds from one or more speakers of a device 102.

The direction module 206 may play a sound through one or more of the speakers of the device 102 to direct the user to move the user's touch on the touch-enabled display towards a direction of the line corresponding to the user's touch. For instance, the user's touch may correspond to a vertical line located in the middle of the display, and the direction module 206 may cause two speakers, one on each side of the display, to play a sound to direct the user's touch along the vertical line, either towards the "top" of the display or towards the "bottom" of the display. Alternatively, if the device 102 has speakers located at the top and bottom of the display, the direction module 206 may play a sound through the top speaker only to direct the user to move the touch towards the top, or may play a sound through the bottom speaker only to direct the user to move the touch towards the bottom.

In another example, the user's touch may correspond to a curved line. In such an embodiment, the direction module 206 may play different sounds, or sounds at different frequencies, from the speakers to direct the user's touch up, down, left, right, front, back, and/or any combinations of the foregoing along the lines of the graphic so that the user can create a mental image of the graphic.

In such an embodiment, the direction module 206 provides the at least one sound through a plurality of speakers of the device using stereo sound orientation to provide an audio direction for following the line with the touch in the direction of the at least one sound. Accordingly, the initial direction for the user's touch may be based on a predefined navigation orientation for the display, e.g., from the bottom up and from right to left, and/or the like.

In one embodiment, the sound that the direction module 206 plays through the speakers to direct the user's touch is associated with at least one pixel of the graphic that is located along the line at a position that is adjacent to a current pixel that corresponds to the touch. For instance, the sound may be associated with the next pixel of the line, e.g., as metadata for the pixel or dynamically determined in real-time based on the location of the pixel relative to the location of the speakers for the device, in a direction that is adjacent to the user's current touch. For example, if the line continues in two directions relative to the user's touch, e.g., left or right, the sound may be intended to direct the user's touch towards a pixel that is adjacent to the pixel associated with the user's current touch, e.g., in the left direction. The particular direction may be based on a default setting (e.g., default is left and up), based on whether the user has previously touched that location or pixel (e.g., to avoid already touched areas of the line/graphic), and/or the like.

In one embodiment, in response to determining that the touch is at a location on the display that does not correspond to a line of the graphic, the direction module 206 provides at least one sound to direct the touch to a line of the graphic that is nearest to the touch. In such an embodiment, the sound that is used to direct the user's touch to a line is different than the sound that is used while the user is touching the line such that the user can distinguish between non-line areas, e.g., background areas of the graphic, and a line defining the content of the graphic. The sounds may comprise beeps or tones that are played at different frequencies, volumes, tones, pitches, or the like.

In one embodiment, the input module 204 detects that the user's touch is at an intersection of a plurality of lines of the graphic. For instance, the user's touch may be detected at a corner or other vertex where multiple lines of the content of the graphic end, meet, intersect, or the like. In such an embodiment, the direction module 206 provides a plurality of different sounds to direct the touch to each of the intersecting lines individually. For instance, the direction module 206 may provide a series of beeps for each line, e.g., one beep for one line, two beeps for another line, and so on, using stereo sound orientation to not only notify the user that there are multiple different paths/lines that the user can follow, but to also direct the user's touch in a direction of the different paths/lines.

Figure 3:
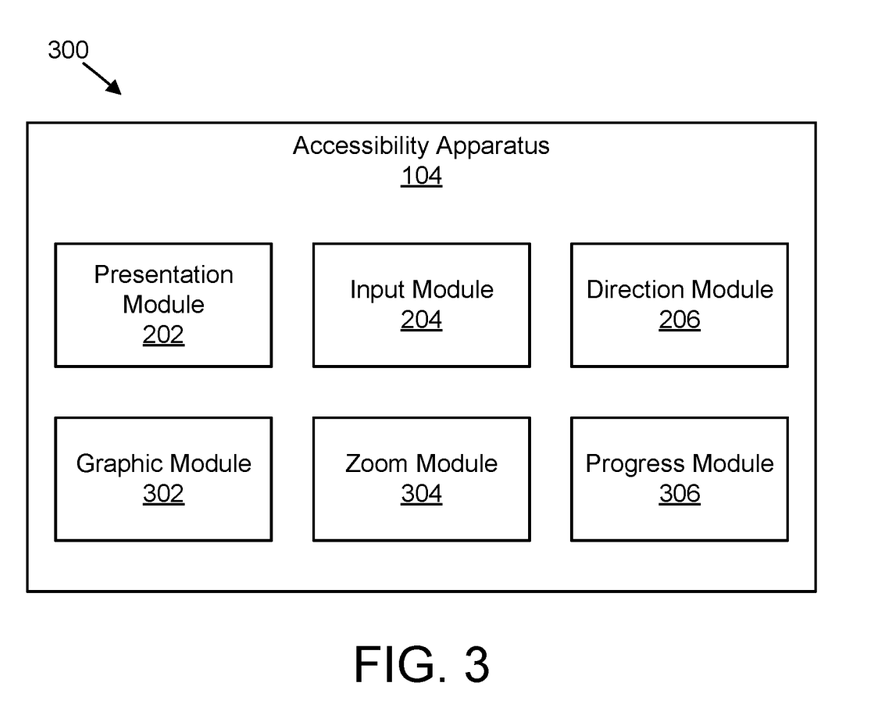
FIG. 3 is a schematic block diagram illustrating one embodiment of another apparatus for sound-directed graphic accessibility.

FIG. 3 is a schematic block diagram illustrating one embodiment of another apparatus 300 for sound-directed graphic accessibility. In one embodiment, the apparatus 300 includes an instance of an accessibility apparatus 104. The accessibility apparatus 104, in certain embodiments, includes a presentation module 202, an input module 204, and a direction module 206, which may be substantially similar to the presentation module 202, the input module 204, and the direction module 206 described above with reference to FIG. 2. The accessibility apparatus 104, in further embodiments, includes one or more of a graphic module 302, a zoom module 304, and a progress module 306, which are described in more detail below.

The graphic module 302, in one embodiment, is configured to receive, access, download, open, read, and/or the like the graphic for presentation on the display. For instance, the graphic may be an image in full color downloaded from a webpage, a file server, a photo sharing site, a social media site, an e-commerce platform, and/or the like.

In response to receiving the graphic, the graphic module 302 formats the graphic as the binary graphic using at least one image processing algorithm for identifying and defining the edges of the objects within the graphic prior to presenting the graphic on the display. The graphic module 302 may recolor the graphic so that the edges/lines and the background are different, contrasting colors such as black for the lines and white for the background, or vice-versa.

Thus, the graphic module 302 generates a binary graphic where one color represents the lines of the objects within the graphic and one color represents a background. In such an embodiment, the input module 204 and/or the direction module 206 determines that the touch is at a location on the display that corresponds to a line of the graphic by determining whether at least one pixel corresponding to the touch comprises a color that represents a line of the graphic. Furthermore, in such an embodiment, a sound associated with a color that represents a line of the graphic is different from a sound that represents a background of the graphic.

In one embodiment, the graphic module 302 generates metadata for the graphic, for each pixel of the graphic, for regions of the graphic (e.g., line regions v. background regions), and/or the like. The metadata may include information for a sound that the graphic module 302 encodes in the metadata, e.g., for a pixel. The sound information for a pixel, for instance, may include a tone and/or frequency for the sound to be played through each speaker for a device, which is based on the location of the pixel on the display relative to the location of the speakers on the device 102 (which may be determined by querying for the specifications of the device 102 from the BIOS, operating system, or the like). The direction module 206 may use the encoded sound information for a pixel to determine the sound that should be played when the user's touch is near, adjacent, proximate, or the like to the pixel.

The zoom module 304, in one embodiment, is configured to dynamically zoom a portion of the display around the touch in response to the graphic at the touch location comprising a plurality of lines that are covered simultaneously by the touch. For example, if the user's touch overlaps multiple lines, the zoom module 304 may dynamically, automatically, or the like zoom or magnify an area around the user's touch to help the user maintain a touch on a particular line without crossing over onto a different line. The zoom module 304 may utilize existing accessibility features of the operating system, device, and/or the like to provide the zoomed area.

The progress module 306, in one embodiment, is configured to provide an audible indication of an amount of the graphic that has been touched and/or an indication of an amount of the graphic that remains untouched. The progress module 306, for instance, may track, remember, store, or the like the areas of the graphic that the user has touched, which can be used to calculate the amount of the lines that the user has touched as a function of the total amount of lines. The progress module 306 may provide a voice response, a sound response (e.g., a series of beeps), or the like that indicates the user's progress in touching the lines of the graphic or the remaining area of the graphic that is untouched.

Figure 4:
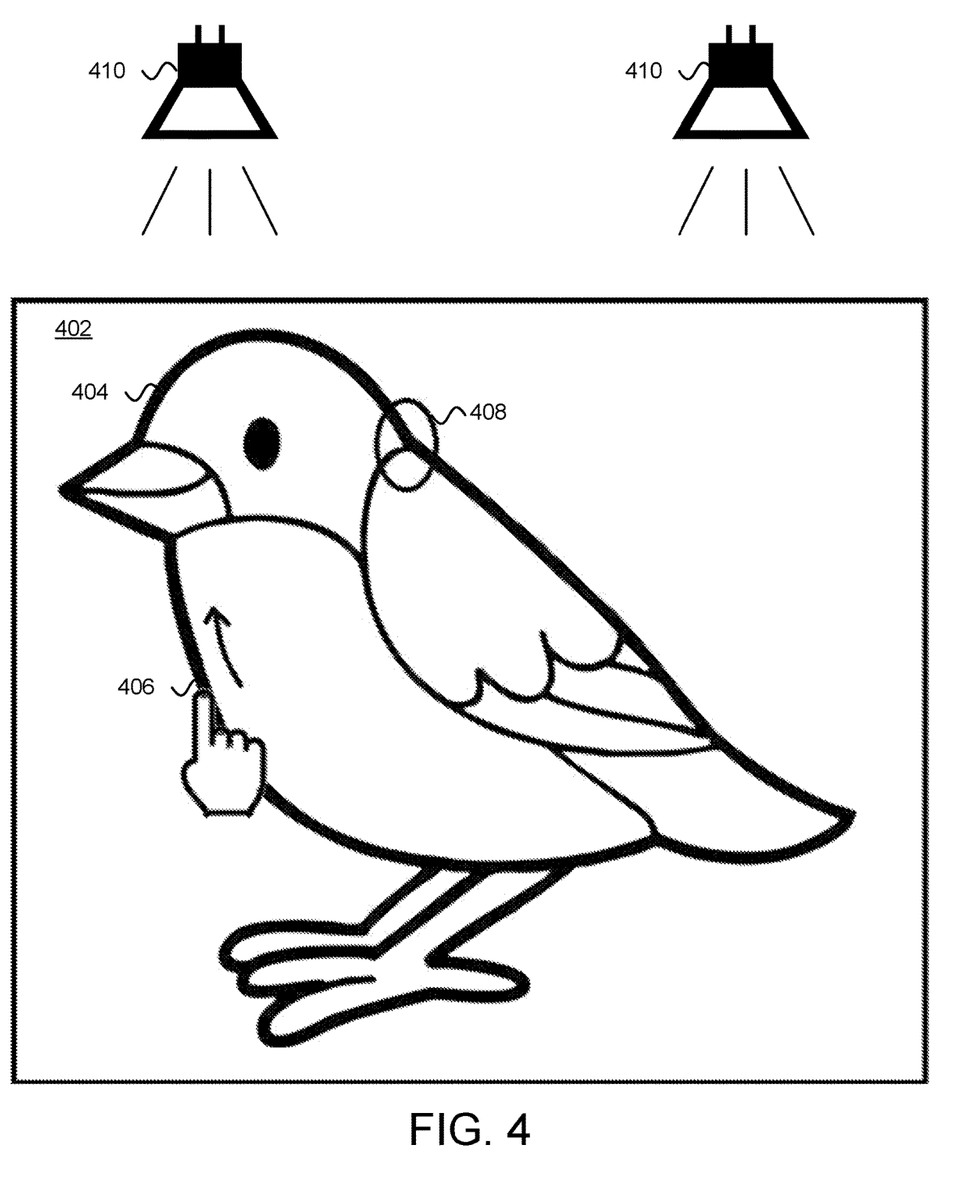
FIG. 4 illustrates an example embodiment of sound-directed graphic accessibility.

FIG. 4 depicts one embodiment of an example embodiment for sound-directed graphic accessibility. In one embodiment, a touch-enabled display 402 is provided for presenting a graphic 404 defined by a series of lines/edges.

A user may touch the display 402 at a touch location 406 that is on a line. In response to determining that the user's touch is on the line of graphic, the direction module 206 may determine a sound for an adjacent pixel for directing the user's touch along the line towards the sound.

For instance, the direction module 206 may direct the user's touch along the line up and to the left. In such an embodiment, the direction module 206 may play a sound through the speakers 410, which may be located around or near the display 402, in such a way as to provide stereo sound orientation to direct the user to move their finger across the display 402 along the line, e.g., louder or higher frequency sound may be played through speakers located to the left and/or top of the user's touch to direct the user's touch towards the sound. In certain embodiments, if the user's touch comes to an intersection point 408, the direction module 206 provides different sounds, e.g., beeps, to indicate the different paths/lines that the user can follow with the touch and also a direction of the different paths/lines.

Figure 5:
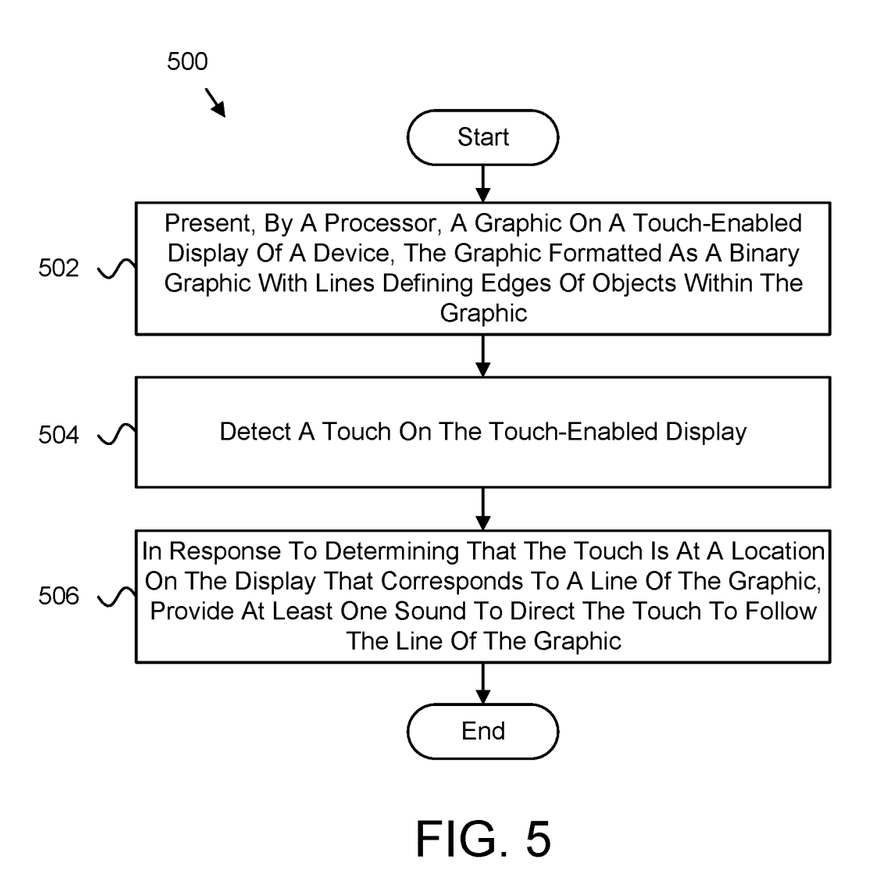
FIG. 5 is a schematic flow chart diagram illustrating one embodiment of a method for sound-directed graphic accessibility.

FIG. 5 is a schematic flow chart diagram illustrating one embodiment of a method 500 for sound-directed graphic accessibility. In one embodiment, the method 500 begins and presents 502, by a processor, a graphic on a touch-enabled display of a device. The graphic may be formatted as a binary graphic with lines defining edges of objects within the graphic.

In further embodiments, the method 500 detects 504 a touch on the touch-enabled display. In further embodiments, the method 500, in response to determining that the touch is at a location on the display that corresponds to a line of the graphic, provides 506 at least one sound to direct the touch to follow the line of the graphic, and the method 500 ends. In one embodiment, the presentation module 202, the input module 204, and the direction module 206 perform the various steps of the method 500.

Figure 6:
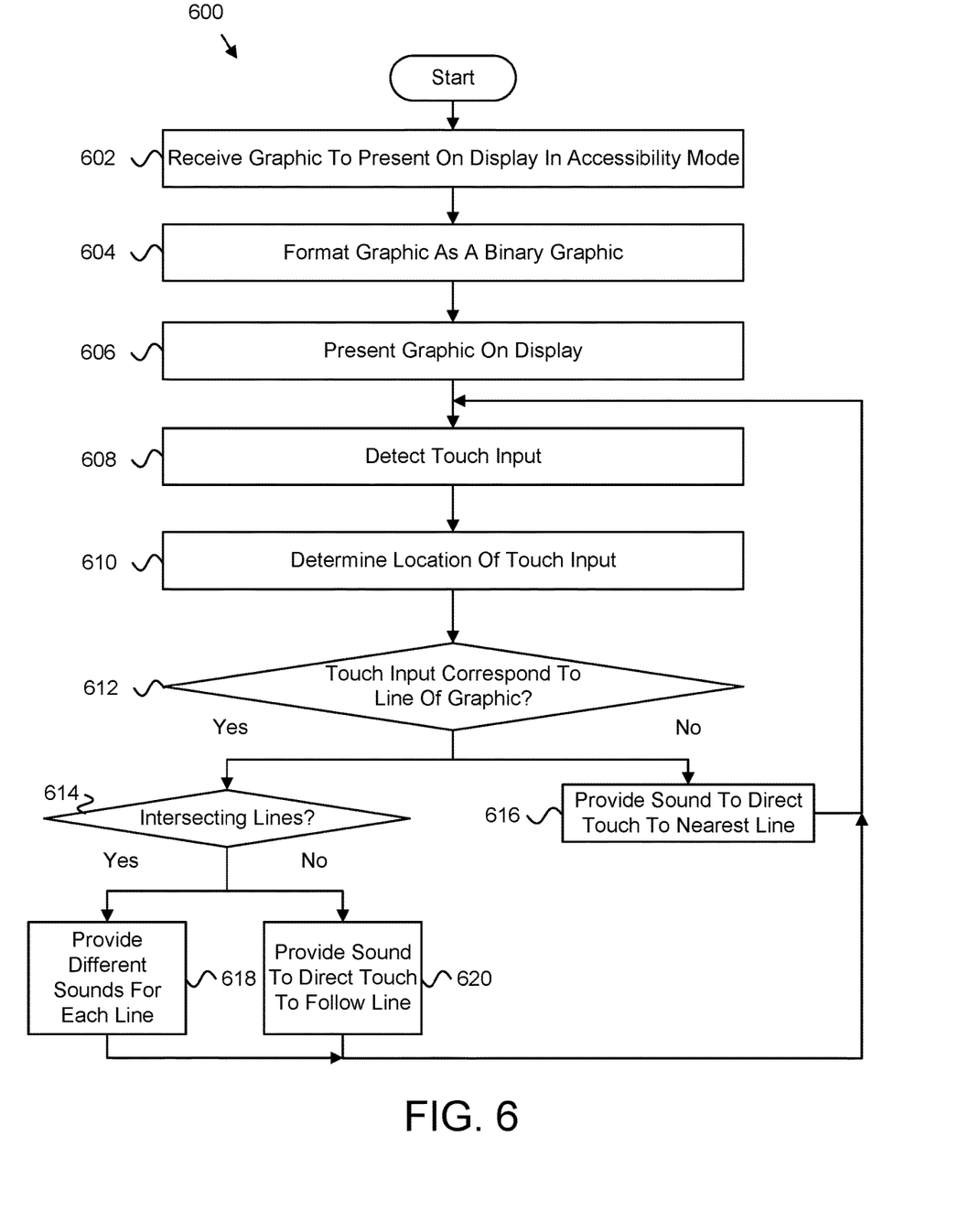
FIG. 6 is a schematic flow chart diagram illustrating one embodiment of another method for sound-directed graphic accessibility.

FIG. 6 is a schematic flow chart diagram illustrating one embodiment of another method 600 for sound-directed graphic accessibility. In one embodiment, the method 600 begins and receives 602 a graphic for presentation on a multi-touch display for a device in an accessibility mode. In further embodiments, the method 600 formats 604 the graphic as a binary graphic, e.g., a black and white image.

In one embodiment, the method 600 presents 606 the graphic on the display and detects 608 a touch input on the display. In one embodiment, the method 600 determines 610 the location of the touch input on the display. If the method 600, in certain embodiments, determines 612 that the location of the touch input corresponds to a line of the graphic, and the method 600 determines 614 that the location of the touch input is at a point where multiple lines intersect or meet, the method 600 provides 618 different sounds to direct the user's touch separately along each of the lines, and the method 600 continues to detect 608 touch input.

Otherwise, the method 600 provides 620 a sound to direct the user's touch to continue following the line that the user is currently touching and continues to detect 608 touch input. If the method 600, in one embodiment, determines 612 that the location of the touch input does not correspond to a line of the graphic, e.g., the touch is detected in a background area of the graphic, the method 600 provides 616 a sound to direct the user's touch to the nearest line of the graphic, and the method 600 continues to detect 608 touch input. In one embodiment, the presentation module 202, the input module 204, the direction module 206, and the graphic module 302 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a memory that stores code executable by the processor to:
      present a graphic on a touch-enabled display of a device, the graphic formatted as a binary graphic with lines defining edges of objects within the graphic;
      detect a touch on the touch-enabled display; and
      in response to determining that the touch is at a location on the display that corresponds to a line of the graphic, provide a first sound to notify a user that the touch is at the location on the display that corresponds to the line of the graphic and provide second sounds to the user to direct the user to follow the line of the graphic, wherein each second sound occurs prior to the user touching a next adjacent pixel on the line of the graphic to guide the user's touch along the line of the graphic toward each respective second sound.

2. The apparatus of claim 1, wherein the code is executable by the processor to, in response to determining that the touch is at a location on the display that does not correspond to a line of the graphic, provide at least one sound to direct the touch to a line of the graphic that is nearest to the touch, the at least one sound to direct the touch to a line of the graphic that is nearest to the touch different from the at least one sound to direct the touch to follow the line of the graphic.

3. The apparatus of claim 1, wherein the code is executable by the processor to:
   detect that the touch is at an intersection of a plurality of lines of the graphic; and
   provide a plurality of different sounds to direct the touch to each of the intersecting lines individually, each of the plurality of sounds corresponding to a direction of each of the plurality of intersecting lines from a location of the touch.

4. The apparatus of claim 3, wherein the plurality of different sounds comprises a plurality of different beeps.

5. The apparatus of claim 1, wherein the code is executable by the processor to provide the at least one sound through a plurality of speakers of the device using stereo sound orientation to provide an audio direction for following the line with the touch in the direction of the at least one sound.

6. The apparatus of claim 5, wherein the audio direction for an initial touch is in a direction based on a navigation orientation from a bottom of the display towards a top of the display.

7. The apparatus of claim 5, wherein the audio direction comprises at least one of left, right, front, back, and/or a combination of the foregoing.

8. The apparatus of claim 1, wherein the at least one sound is associated with at least one pixel of the graphic that is located along the line at a position that is adjacent to a current pixel that corresponds to the touch.

9. The apparatus of claim 8, wherein metadata for the at least one sound is encoded in metadata for the at least one pixel.

10. The apparatus of claim 1, wherein the code is executable by the processor to:
receive the graphic for presentation on the display; and
format the graphic as the binary graphic using at least one image processing algorithm for identifying and defining the edges of the objects within the graphic prior to presenting the graphic on the display.

11. The apparatus of claim 10, wherein the binary graphic comprises a graphic where one color represents the lines of the objects within the graphic and one color represents a background, the code executable by the processor to determine that the touch is at a location on the display that corresponds to a line of the graphic by determining whether at least one pixel corresponding to the touch comprises a color that represents a line of the graphic.

12. The apparatus of claim 11, wherein a sound associated with a color that represents a line of the graphic is different from a sound that represents a background of the graphic.

13. The apparatus of claim 1, wherein the code is executable by the processor to dynamically zoom a portion of the display around the touch in response to the graphic at the touch location comprising a plurality of lines that are covered simultaneously by the touch.

14. The apparatus of claim 1, wherein the code is executable by the processor to provide an audible indication of an amount of the graphic that has been touched and/or an indication of an amount of the graphic that remains untouched.

15. A method, comprising:
presenting, by a processor, a graphic on a touch-enabled display of a device, the graphic formatted as a binary graphic with lines defining edges of objects within the graphic;
detecting a touch on the touch-enabled display; and
in response to determining that the touch is at a location on the display that corresponds to a line of the graphic, providing a first sound to notify a user that the touch is at the location on the display that corresponds to the line of the graphic and provide second sounds to the user to direct the user to follow the line of the graphic, wherein each second sound occurs prior to the user touching a next adjacent pixel on the line of the graphic to guide the user's touch along the line of the graphic toward each respective second sound.

16. The method of claim 15, further comprising, in response to determining that the touch is at a location on the display that does not correspond to a line of the graphic, providing at least one sound to direct the touch to a line of the graphic that is nearest to the touch, the at least one sound to direct the touch to a line of the graphic that is nearest to the touch different from the at least one sound to direct the touch to follow the line of the graphic.

17. The method of claim 15, further comprising:
detecting that the touch is at an intersection of a plurality of lines of the graphic; and
providing a plurality of different sounds to direct the touch to each of the intersecting lines individually, each of the plurality of sounds corresponding to a direction of each of the plurality of intersecting lines from a location of the touch.

18. The method of claim 15, further comprising providing the at least one sound through a plurality of speakers of the device using stereo sound orientation to provide an audio direction for following the line with the touch in the direction of the at least one sound.

19. The method of claim 15, further comprising dynamically zooming a portion of the display around the touch in response to the graphic at the touch location comprising a plurality of lines that are covered simultaneously by the touch.

20. A computer program product, comprising a non-transitory computer-readable storage medium having program instructions embodied therewith, the program instructions executable by a processor to cause the processor to:
present a graphic on a touch-enabled display of a device, the graphic formatted as a binary graphic with lines defining edges of objects within the graphic;
detect a touch on the touch-enabled display; and
in response to determining that the touch is at a location on the display that corresponds to a line of the graphic, provide a first sound to notify a user that the touch is at the location on the display that corresponds to the line of the graphic and provide second sounds to the user to direct the touch to follow the line of the graphic, wherein each second sound occurs prior to the user touching a next adjacent pixel on the line of the graphic to guide the user's touch along the line of the graphic toward each respective second sound.

* * * * *